(12) United States Patent
Gammons

(10) Patent No.: US 7,878,556 B2
(45) Date of Patent: Feb. 1, 2011

(54) SAFETY RELEASE ADAPTER

(75) Inventor: Clifford E. Gammons, Loudon, TN (US)

(73) Assignee: Adroit Development, Inc., Loudon, TN (US)

( * ) Notice: Subject to any disclaimer, the term of this patent is extended or adjusted under 35 U.S.C. 154(b) by 0 days.

(21) Appl. No.: 12/395,893

(22) Filed: Mar. 2, 2009

(65) Prior Publication Data

US 2009/0218812 A1 Sep. 3, 2009

Related U.S. Application Data

(60) Provisional application No. 61/033,054, filed on Mar. 3, 2008.

(51) Int. Cl.
*F16L 21/02* (2006.01)

(52) U.S. Cl. .................... 285/369; 285/1; 285/305

(58) Field of Classification Search .............. 285/1, 285/239, 305, 345, 374, 372, 369, 418, 417
See application file for complete search history.

(56) References Cited

U.S. PATENT DOCUMENTS

| | | | | |
|---|---|---|---|---|
| 2,889,089 | A | * | 6/1959 | Herrick et al. ............... 222/540 |
| 3,368,592 | A | * | 2/1968 | Thiel et al. ..................... 141/69 |
| 3,603,621 | A | * | 9/1971 | Parsons ....................... 285/319 |
| 4,067,534 | A | * | 1/1978 | Frey ............................ 285/319 |
| 4,238,059 | A | * | 12/1980 | Caraway et al. ............. 222/529 |
| 4,310,185 | A | * | 1/1982 | Bartholomew .............. 285/369 |
| 4,396,210 | A | * | 8/1983 | Spencer et al. ................ 285/38 |
| 5,046,763 | A | * | 9/1991 | Martucci et al. .............. 285/81 |
| 5,104,158 | A | | 4/1992 | Meyer et al. |
| 5,131,687 | A | * | 7/1992 | Marchou ...................... 285/23 |
| 5,637,102 | A | * | 6/1997 | Tolkoff et al. ............... 604/536 |
| 5,799,986 | A | * | 9/1998 | Corbett et al. ................ 285/55 |
| 5,931,510 | A | * | 8/1999 | Mathew et al. ........... 285/148.21 |
| 6,854,770 | B2 | * | 2/2005 | Leblanc ..................... 285/230 |
| 6,893,055 | B2 | * | 5/2005 | Thomas et al. .............. 285/319 |

(Continued)

FOREIGN PATENT DOCUMENTS

DE 3502424 A1 * 7/1986

(Continued)

OTHER PUBLICATIONS

USPTO, Non-Final Office Action mailed Jun. 30, 2008 for U.S. Appl. No. 11/298,399, filed Dec. 9, 2005.

*Primary Examiner*—David E Bochna
(74) *Attorney, Agent, or Firm*—Knox Patents; Thomas A. Kulaga

(57) ABSTRACT

A safety release adapter for making a sealed fluid connection with a male connector that is disconnected when a pulling force is applied between the adapter and the connector. The safety release adapter includes a base and a socket. The base receives and secures a first male connector. The socket includes a cavity with a lip at the distal end of the socket. The socket releasably secures a second male connector with the lip inside the socket opening engaging a neck of the second male connector. The first male connector extends into the socket in a sealed interface with the socket such that when the second male connector is secured in the socket with a sealed interface with the socket, the valve buttons of each connector are mutually depressed so the two connectors are in sealed fluid communication.

16 Claims, 2 Drawing Sheets

U.S. PATENT DOCUMENTS

| | | | |
|---|---|---|---|
| 7,331,613 B2 * | 2/2008 | Schulte | 285/239 |
| 7,354,078 B2 * | 4/2008 | Yoshino | 285/319 |
| 2006/0128180 A1 | 6/2006 | Gammons | |
| 2007/0085340 A1 | 4/2007 | Gammons | |

FOREIGN PATENT DOCUMENTS

| | | | |
|---|---|---|---|
| JP | 06101790 | | 4/1994 |
| JP | 06101790 A | * | 4/1994 |

* cited by examiner

SAFETY RELEASE ADAPTER

CROSS-REFERENCE TO RELATED APPLICATIONS

This application claims the benefit of U.S. Provisional Application No. 61/033,054, filed Mar. 3, 2008.

STATEMENT REGARDING FEDERALLY SPONSORED RESEARCH OR DEVELOPMENT

Not Applicable

BACKGROUND OF THE INVENTION

1. Field of Invention

This invention pertains to a safety release adapter. More particularly, this invention pertains to an adapter that receives a male connector to make a sealed fluid connection and releases the male connector when a pulling force is applied between the adapter and the connector without requiring the manipulation of a latching mechanism.

2. Description of the Related Art

It is known in the art of hose connectors to provide various configurations of such connectors to establish fluid communication between selected devices. Typically, a positively-locked connection is made in order to prevent undesired disengagement of the devices in such communication. Release mechanisms of various configurations are provided for unlocking the connection between the components of the connectors. Typically, release mechanisms require active engagement of the mechanism prior to disengagement of the two devices.

While conventional release mechanisms provide positive locking mechanisms for securing two devices in fluid communication, they can also be cumbersome to disengage. In certain situations it is necessary to quickly disconnect devices while the operator may not have the ability to manipulate the release mechanism, grasp both hoses connecting the devices, and pull the two devices apart.

It is known to connect fluid systems with releasable connectors. Mechanical release mechanisms of various configurations are known for unlocking the connection between the components of the connectors. Typically, mechanically operated release mechanisms require active engagement of the mechanism by an operator before disengagement of the two devices. For example, U.S. Pat. No. 5,104,158, issued to Meyer, et al., on Apr. 14, 1992, titled "Two piece molded female coupling," discloses a female connector with a mechanism that releases a male connector by pressing an operator on the female connector. A common feature of these types of connectors is that the female connector includes a mechanical assembly that must be actuated to engage and disengage the male connector. In other words, a user must interact with the two connectors when mating and disconnecting the connectors.

U.S. patent application Ser. Nos. 11/298,399 and 11/562,788 also disclose female connectors with an operator that releases a male connector upon pressing the operator. The safety release connectors disclosed in the Applications have a configuration that permits the connectors to be separated upon a sufficient pulling force. The male connector is retained by a tang that has an edge with a chamfer. The edge retains the male connector until a sufficient pulling force is applied.

One application for hose connectors is for making fluid connections to a heat transfer garment that incorporates tubing that provides fluid that circulates a temperature controlled fluid. Oftentimes, heat transfer garments are used where hazardous work is being performed such as driving a race car or fighting fires. Under normal use, the heat transfer garment is attached to a thermal unit that controls the temperature of the fluid and a pump that circulates the fluid. In times of emergency, the wearer must be separated from the bulky thermal unit and pump as quickly as possible. Often in such situations, the wearer is not able to operate or manipulate the hose connectors and the rescue workers must locate and operate the release mechanisms or otherwise sever the connection to the wearer.

BRIEF SUMMARY OF THE INVENTION

A safety release adapter of a resilient material having a tubular configuration that joins two male connectors in a releasable fluid connection is provided. In one configuration, the adapter has a base in which one male connector is fixedly inserted and a socket in which the other connector is removably inserted. The base and socket are hollow cylinders that are formed as an integral tubular piece of a resilient material. The socket has an opening that receives a male connector. The entrance of the opening is defined by a lip having a collar, an entrance ramp, and a retaining face. The lip engages a corresponding groove in a male connector with the retaining face engaging a face of the groove to retain the male connector in the socket when an operating force is applied between the adapter and the connector. The lip releases the connector from the adapter without the manipulation of a latching mechanism when a pulling force greater than the operating force is applied. Another embodiment provides an adapter that joins one male connector to a tube. The adapter has a base that is fixed to a conduit and a socket in which a male connector is removably inserted.

In one embodiment of an apparatus for making a sealed fluid connection between a male connector and a tube, the apparatus includes a safety release adapter having a socket made of resilient material, the socket is cylindrical, the socket has a cavity, the cavity has an interior surface, the cavity has a lip protruding into the cavity, the lip has a chamfered surface, the chamfered surface is adjacent to a cylindrical surface, the cylindrical surface is adjacent to a locking face, and the locking face is adjacent to the interior surface of the cavity. In one such embodiment, the apparatus further includes a base made of resilient material, the base being cylindrical, the base being coaxial with the socket, the base having a bore, the bore having an interior surface, the interior surface dimensioned and configured to fixedly receive a male connector.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

An apparatus for making a sealed fluid connection with a male connector 102 is releasable by applying a pulling force without manipulating a latch mechanism is disclosed.

Figure 1:
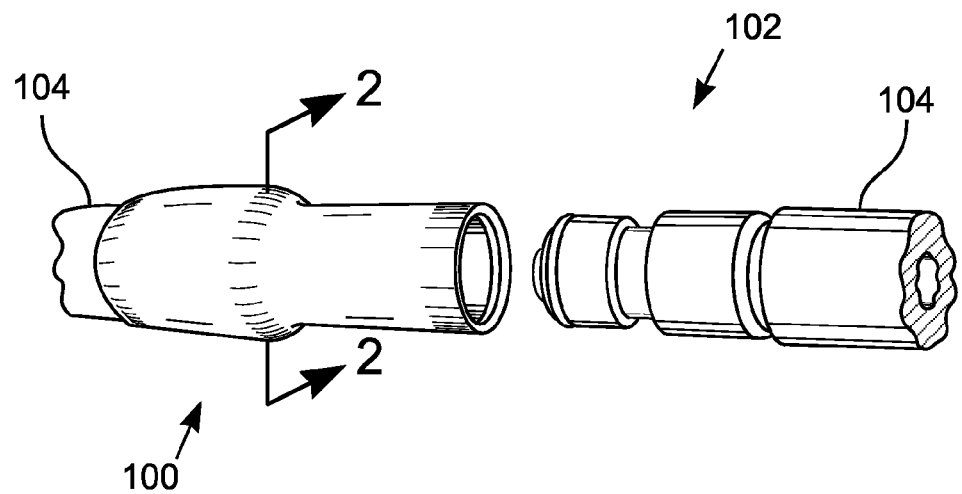
FIG. 1 is a perspective view of one embodiment of the safety release adapter.

FIG. 1 illustrates a perspective view of one embodiment of the safety release adapter 100. The adapter 100 provides a sealed removable connection to a male connector 102. Under operating conditions, when fluid is circulating through the system, there is a pressure associated with the flow of the fluid. This pressure under operating conditions is the operating force. The adapter 100 provides the retention necessary to withstand the operating force. A pulling force that is greater than the operating force releases the connector 102 from the adapter 100. The connector 102 is in sealed fluid communication with a corresponding attached tube 104.

One application for the safety release adapter 100 is a heat transfer garment that incorporates tubing that provides fluid that circulates a temperature controlled fluid. The adapter 100 permits the wearer of the garment to become untethered from the tubing by applying tension to the tubing sufficient to release the connector 102 from the adapter 100. For example, a race car driver wearing a heat transfer garment is able to quickly exit the race car without having to manually manipulate a connector latch.

The safety release adapter 100 provides a connection that is disconnected by the application of an external tension force. The wearer disconnects the connection by pulling the connector 102 out of the adapter 100 with his hands or by moving into a position that applies a tension or pulling force between the adapter 100 and the connector 102. Safely disconnecting the connector 102 by the simple application of a tension force has other favorable uses, such as when the wearer must be removed from an environment when he is unconscious. The safety worker does not have to handle the connector 102 because the disconnection does not require activating a release mechanism, but is disconnected by merely applying a sufficient pulling force.

Figure 2:
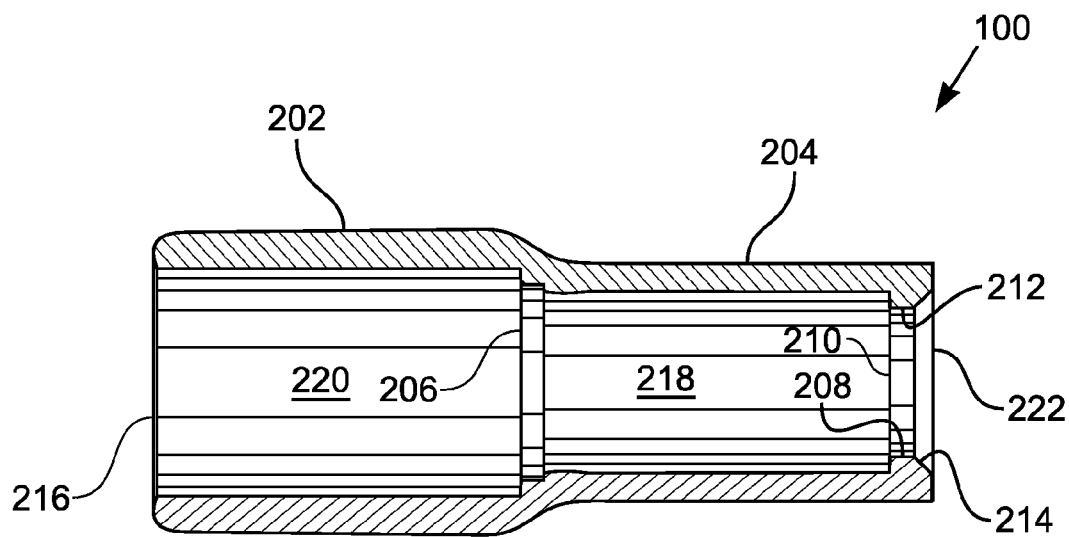
FIG. 2 is a cross-sectional view of one embodiment of the safety release adapter.

FIG. 2 illustrates a cross-sectional view of one embodiment of the safety release adapter 100. The adapter 100 has a base 202 and a socket 204. The base 202 is configured to attach to a male connector 102-A and the socket 204 is configured to receive a male connector 102-B and readily release the connector 102-B when a sufficient tension or pulling force is applied. The adapter 100 is made of a resilient material that is sufficiently hard to maintain the illustrated shape. The base 202 has a cylindrical outer surface that is smooth and of constant diameter. Inside the base 202 is a bore 220 that is cylindrical. The distal end of the base 202 has a base opening 216 where the bore 220 terminates.

The socket 204 has a cylindrical outer surface that is smooth and of constant diameter. Inside the socket 204 is a cavity 218. The cavity 218 is cylindrical, with an interior surface, and has a smaller diameter than the bore 220. The proximal end of the cavity 218 is connected to the proximal end of the bore 220 at a shoulder 206. In the illustrated embodiment, the shoulder 206 has two steps as the inside diameter of the adapter 100 transitions between the bore 220 and the cavity 218. The steps 206 are configured to mate with corresponding features on the male connector 102 inserted into the base 202.

The outside diameter of the base 202 is larger than the outside diameter of the socket 204. The outside surface at the proximal end of the base 202 smoothly transitions to the proximal end of the socket 204 in a radiused step. The adapter 100 has a longitudinal axis that is coaxial with the longitudinal axis of the bore 220 and the longitudinal axis of the cavity 218.

The distal end of the socket 204 has a socket opening 222 with a lip 212 that protrudes into the socket opening 222. The socket opening 222 presents a circular opening into the cavity 218. The lip 212 protruding into the socket opening 222 has a lip face, or retaining face, 210, a collar 208, and a chamfer, or entrance ramp, 214. The lip face 210 is a planar surface that is substantially perpendicular to the longitudinal axis of the cavity 218. The lip face 210 extends between the inside cylindrical surface of the cavity 218 and the collar 208.

The collar 208 has a cylindrical surface and defines the extent that the lip 212 protrudes into the socket opening 222. The collar 208 has a longitudinal axis that is coaxial with the longitudinal axis of the cavity 218. The chamfer 214 is a conical surface between the collar 208 and the distal end of the socket 204. In the illustrated embodiment, the chamfer 214 is approximately at a 45 degree angle to the longitudinal axis of the cavity 218.

Figure 3:
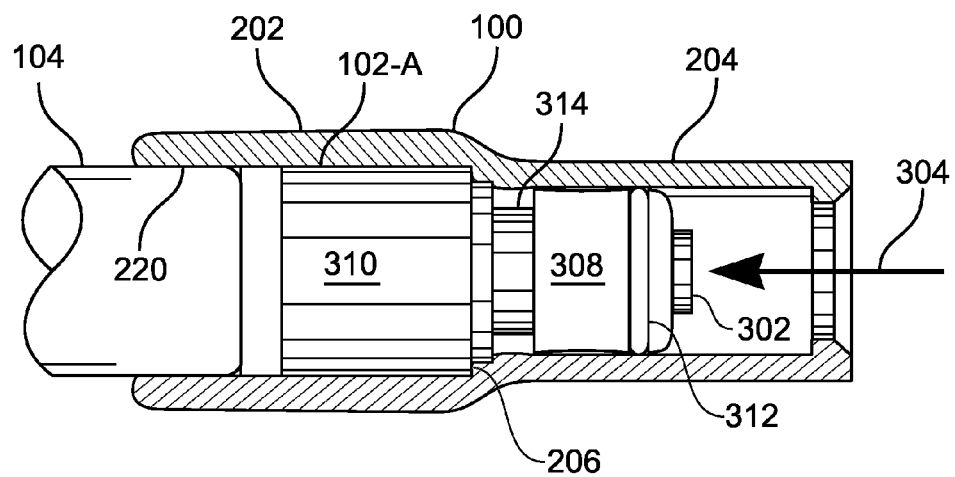
FIG. 3 is a partial cross-sectional view of one embodiment of the safety release adapter with a male connector inserted.

FIG. 3 illustrates a partial cross-sectional view of one embodiment of the safety release adapter 100 with a male connector 102-A inserted in the base 202. The male connector 102 has a plug 308, a connector base 310, and a neck 314. The plug 308 is substantially cylindrical and has an o-ring 312 around its circumference. The o-ring 312 is made of a resilient material of sufficient durometer to form a fluid tight seal between the plug 308 and the cavity 218 where the o-ring 312 engages the cavity 218. The o-ring 312 defines the outermost radial region of the plug 308. When the plug 308 is inserted into the cavity 218, the inner surface of the cavity 218 engages the o-ring 312 to form a fluid tight seal.

In one embodiment, the connector base 310 is cylindrical and is larger in diameter than the plug 308. The distal end of the connector base 310 has a port that is in sealed fluid communication with a tube 104. The connector base 310 fits into the bore 220. The adapter 100 is made of resilient material that allows the bore 220 to expand and contract when the connector base is inserted. The bore 220 is dimensioned and configured to fit securely around the connector base 310 such that it resists removal of the connector base 310 when an axial force 304 is applied. The material of the adapter 100 grips the connector base 310 to retain the connector 102-A in the adapter 100. In operation, when a second connector 102-B is inserted or removed from the socket 204 of the adapter 100, a user grasps the adapter 100 at the base 202, which increases the grip of the base 202 on the connector base 310, thereby ensuring the retention of the connector 102-A inside the bore 220.

The plug 308 is joined to the connector base 310 by a neck 314, which defines a groove between the plug 308 and the base 310. The neck, or groove, 314 is cylindrical and has a smaller diameter than the connector base 310 and the plug 308. The neck 314 has a longitudinal axis that is coaxial to the longitudinal axis of the connector base 310 and the longitudinal axis of the plug 308. The neck 314 is connected to the plug 308 and the connector base 310 at planar faces extending from the neck 314 and substantially perpendicular to the longitudinal axis of the neck 314.

In the illustrated embodiment, the proximal end of the connector base 310 has a two-step shoulder 306. The two-step shoulder 306 fits into the adapter shoulder 206. In various embodiments, the adapter shoulder 206 is dimensioned and configured to receive and mate with the proximal end of the connector base 310. The adapter shoulder 206 locates the connector 102 within the adapter 100 such that the plug 308 is positioned inside the cavity 218. Those skilled in the art will recognize that other geometries to locate the connector 102 can be used without departing from the spirit and scope of the present invention.

In the illustrated embodiment, the distal end of the plug 308 has a valve button 302. When an axial force 304 of sufficient magnitude is applied to the valve button 302 the valve button 302 is displaced toward the connector base 310 and a valve inside the connector 102-A opens. In this way, fluid flow through the connector 102 is inhibited when the connector 102-A is not mated with another connector 102-A.

Figure 4:
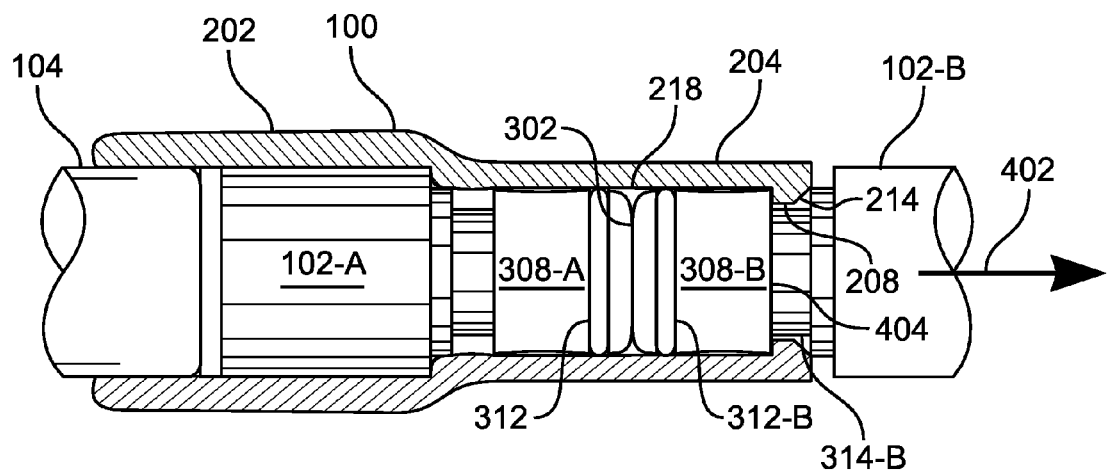
FIG. 4 is a partial cross-sectional view of one embodiment of the safety release adapter with one male connector and the plug of another male connector inserted.

FIG. 4 illustrates a partial cross-sectional view of one embodiment of the safety release adapter 100 with one male connector 102-A in the base 202 and the plug 308-B of another male connector 102-B inserted in the socket 204. The plug 308-B is inserted into the cavity 218 through the socket opening 222. The second male connector 102-B is retained in the socket 204 by the lip 212 engaging the groove 314-B of the connector 102-B.

As the plug 308-B is inserted into the cavity 218, the plug 308-B contacts the chamfer, or entrance ramp, 214 which centers the plug 308-B and provides for the gradual deformation of the lip 212 as the plug 308-B passes through the lip 212. In the illustrated embodiment, the chamfer 214 is approximately at a 45 degree angle to the longitudinal axis of the cavity 218. In other embodiments, the angle of the chamfer 214 varies according to the desired insertion force and resilience of the adapter 100.

As the plug 308-B is further inserted into the cavity 218, the plug 308-B presses against the other plug 308-A within the cavity 218 to engage the valve buttons 302 of each of the plugs 308-A, 308-B. When the plug 308-B is fully seated, the valve buttons 302 are fully engaged and the valve inside each plug 308-A, 308-B is opened. Also, when the plug 308-B is fully seated, the lip, or retaining, face 210 in the cavity 218 is engaged by the locking face 404 of the groove 314. The locking face 404 is a planar face of the groove 314 that is proximate the plug 308-B, and the locking face 404 functions to retain the connector 102-B in the adapter 100. The locking face 404 is engaged by the retaining face 210 when the plug 308-B is fully seated into the cavity 218. The inner surface of the cavity 218 engages the o-ring 312 of the plug 308-B to form a fluid tight seal. With the valve buttons 302 engaged, the plugs 308-A, 308-B are in sealed fluid communication within the cavity 218.

Under operating conditions, the fluid flowing through the connectors 102 is under pressure. When the plugs 308-A, 308-B are in sealed fluid communication, the pressure in the system applies an axial force 402 to the second connector 102-B that would cause the connector 102-B to be disconnected if not for the adapter 100 retaining the connector 102-B. The lip 212 protrudes into the socket opening 222 such that the retaining face 210 engages the locking face 404. The resilience of the material forming the adapter 100 is such that the retaining face 210 and the collar 208 surrounding the neck 314 resist the axial force 402 when the magnitude of the force 402 is less than a pulling force.

The plug 308-B disengages from the cavity 218 when the magnitude of the axial force 402 reaches a pulling force magnitude, which is the force required to pull the plug 308-B from the adapter 100. The resilient material that forms the cavity 218 and the lip 212 flexes as the locking face 404 presses against the lip face 210. When the axial force 402 reaches a specified value in excess of the force under operating conditions, the lip 212 stretches open elastically in the direction of the axial force 402 to allow the plug 308-B to slide out of the cavity 218. The elastic deformation of the lip 212 provides for the recovery of the original shape of the lip 212 after extraction of the plug 308-B, thus allowing the adapter 100 to be reused.

The lip face 210 is located with respect to the valve button 302 of the opposing connector 102-A such that when the locking face 404 is engaged by the lip face 210, the plug 308-B engages the valve button 302 of the opposing connector 102-A. In other embodiments, fluid flows freely through the connector 102 without the restriction of a valve. In other embodiments, the adapter base 202 is assembled in sealed fluid communication with a tube 104 and the plug 308-B is inserted into the cavity 218 to make a fluid tight connection between the tube 104 and the connector 102-B.

In another embodiment, the adapter 100 is configured to directly attach to a tube. In such a configuration, either the mating connector 102-B has no valve actuated by a valve button 302 or the adapter includes an internal stop that engages the valve button 302 to operate the valve in the plug 308-B.

The safety release adapter 100 includes various functions. The function of retaining a male connector 102 is implemented, in one embodiment, by a lip 212 that protrudes into the socket opening 222. The lip 212 engages the locking face 404 of the male connector 102 to retain the male connector under operating conditions. The function of making a fluid tight seal around a male connector 102 is implemented, in one embodiment, by the cavity 218 that provides a sealing surface against the o-ring 312 of a male plug 308.

From the foregoing description, it will be recognized by those skilled in the art that a safety release adapter 100 has been provided. The safety release adapter 100 is presented with two chambers 220, 218, one chamber, the bore 220, is in fixed sealed fluid communication with a tube 104. The other chamber, the cavity 218, retains a male plug 308 in sealed fluid communication with the tube 104, but provides for removal by an axial force 402 at a specified value.

According to one embodiment of the present invention, a safety release adapter 100 releasably receives a male connector 102-B that is released by applying a specified pulling force. The adapter 100 has a base 202 in which one male connector 102-A is fixedly inserted and a socket 204 in which the other connector 102-B is removably inserted. The base 202 has an inside diameter smaller than an outside diameter of the connector base 310. The base 202 is sufficient resilient that the base 202 expands to receive the connector base 310 and then returns to its original size to grip the connector base 310.

The socket 204 has an opening 222 with an inside diameter smaller than the outside diameter of the plug 308-B. The socket 204 is sufficiently resilient that the opening 222 expands to allow passage of the plug 308-B and then returns to its original diameter when the lip 212 is in register with the groove 314 of the connector 102-B such that the lip 212 engages the groove 314. The resilience of the socket 204 is such that the lip 212 retains the male connector 102 when an operating force is applied between the adapter 100 and the connector 102-B. The lip 212 releases the connector 102 from the adapter 100 without the manipulation of a latching mechanism when the axial force 402 reaches a specified pulling force value that is in excess of the axial force 402 under operating conditions.

Another embodiment provides an adapter 100 that joins one male connector 102 to a tube 104. The adapter 100 has a base 202 that is fixed to a tube 104 and a socket 204 in which a male connector 102 is removably inserted.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. An apparatus for making a removable sealed fluid connection, said apparatus comprising:
   a first male connector and a second male connector, each of said first and second male connector having a connector base that is substantially cylindrical, each of said first and second male connector having a plug end distal to said connector base, said plug end having a diameter less than an outside diameter of said connector base, each said plug end having a resilient seal distal to a groove that is circumferential;
   a base having a bore dimensioned and configured to receive and secure said connector base of said first male connector, said base having an inside diameter smaller than said outside diameter of said connector base of said first male connector, said base being resilient such that said first male connector is retained relative to said base when said connector base of said first male connector is positioned in said base; and
   a socket with a cavity and a lip, said cavity dimensioned and configured to receive said plug end of said first male connector and said plug end of said second male connector, said socket connected to said base with said bore in sealed fluid communication with said cavity, said lip defining an opening having an inside diameter less than an outside diameter of said plug end of said second male connector, said socket being resilient such that said opening is expandable to receive said plug end, and said lip configured to engage said groove in said second male connector when said groove is in register with said lip and said plug end of said first male connector is proximate said plug end of said second male connector.

2. The apparatus of claim 1 wherein said socket is sufficiently resilient such that said second male connector is removable from said cavity upon application of a specified pulling force, and said socket is sufficiently rigid such that said second male connector is retained in said cavity when less than said specified pulling force is applied.

3. The apparatus of claim 1 wherein said lip is sufficiently resilient such that said opening is expandable when a specified pulling force is applied to said second male connector when said second male connector is captive in said cavity, wherein said second male connector is removable from said cavity upon application of said specified pulling force.

4. The apparatus of claim 1 wherein said cavity is dimensioned to receive said plug end of said first male connector when said first male connector is inserted in said base, said cavity having an inside diameter dimensioned to engage said resilient seal on said plug end of said first male connector.

5. The apparatus of claim 4 wherein said cavity has an inside diameter dimensioned to contact and form a fluid seal with an outside surface of said plug end of said first male connector and with an outside surface of said plug end of said second male connector.

6. The apparatus of claim 1 wherein said lip includes a first face proximate said cavity, said first face positioned to engage a corresponding face in said groove of said second male connector when a distal end of said plug end of said second male connector engages a distal end of said first male connector inside said cavity.

7. The apparatus of claim 1 wherein said cavity has a length sufficient to contain a portion of said plug end of said first male connector and said plug end of said second male connector when said lip engages said groove of said second male connector.

8. The apparatus of claim 1 wherein said first male connector releasably engages said base and said second male connector releasably engages said socket.

9. An apparatus for making a sealed fluid connection, the connection being releasable, said apparatus comprising:
   a first male connector having a connector base that is substantially cylindrical and a plug distal to said connector base, said plug end having a diameter less than an outside diameter of said connector base;
   a socket with a cavity and a lip, said socket attached to said connector base of said first male connector, said plug end of said first male connector extending into a medial portion of cavity, said cavity dimensioned and configured to receive a plug end of a second male connector, said lip defining an opening into said cavity, said opening having an inside diameter less than an outside diameter of said plug end of said second male connector, said socket being resilient such that said opening is expandable to receive said plug end of said second male connector, and said lip configured to engage a groove in said plug end of said second male connector when said groove is in register with said lip, said cavity being cylindrical and having an inside diameter dimensioned to contact and form a fluid seal with an outside surface of said plug end of said first connector and said plug end of said second first connector.

10. The apparatus of claim 9 wherein said lip includes a first face proximate said cavity, said first face substantially perpendicular to a longitudinal axis of said cavity, said first face configured to engage a corresponding face in said groove of said first male connector when said groove is in register with said lip.

11. The apparatus of claim 9 wherein said socket is sufficiently resilient such that said second male connector is removable from said cavity upon application of a specified pulling force, and said socket is sufficiently rigid such that said second male connector is retained in said cavity when less than said specified pulling force is applied.

12. The apparatus of claim 9 wherein said lip is sufficiently resilient such that said opening is expandable when a specified pulling force is applied to said second male connector when said second male connector is captive in said cavity, wherein said second male connector is removable from said cavity upon application of said specified pulling force.

13. The apparatus of claim 9 further including a base having a bore dimensioned and configured to receive and secure said connector base of said first male connector, said base having an inside diameter smaller than said outside diameter of said connector base of said first male connector, said base being resilient such that said first male connector is retained relative to said base, and said socket connected to said base with said bore in sealed fluid communication with said cavity.

14. The apparatus of claim 13 wherein said lip includes a first face proximate said cavity, said first face positioned to engage a corresponding face in said groove of said second male connector when a distal end of said plug end of said second male connector engages a distal end of said first male connector inside said cavity.

15. The apparatus of claim 13 wherein said cavity has a length sufficient to contain a portion of a plug end of said second male connector and said plug end of said first male connector when said lip engages said groove of said first male connector.

16. The apparatus of claim 9 wherein said first male connector releasably engages said socket, said groove of said plug end of said first male connector being circumferential, and said plug end having a seal configured to contact an inside surface of said cavity.

* * * * *